A. D. RAY.
RESILIENT VEHICLE WHEEL.
APPLICATION FILED APR. 2, 1909.
1,042,035.
Patented Oct. 22, 1912.
2 SHEETS—SHEET 1.
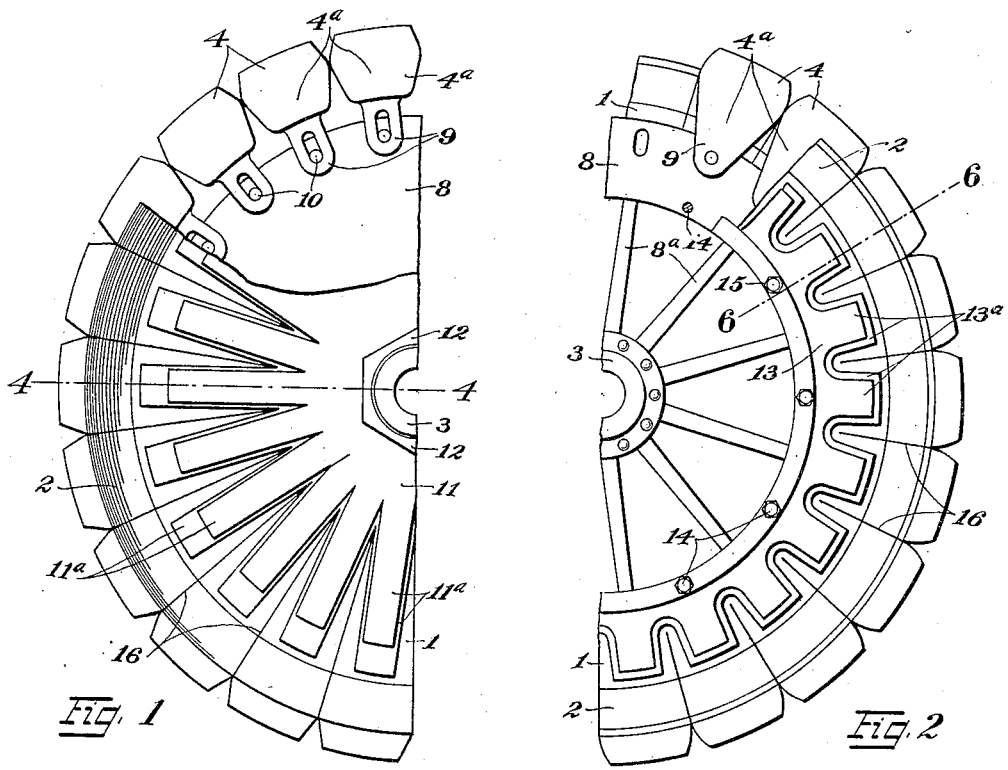
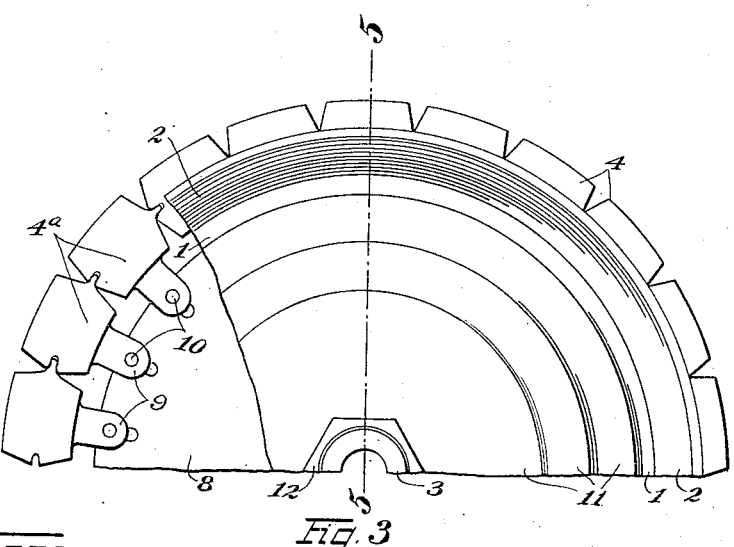
Witnesses:
F. C. Valentine
Gae Romano
Inventor:
Albert D. Ray
by Obed B. Billman
his attorney.

A. D. RAY.
RESILIENT VEHICLE WHEEL.
APPLICATION FILED APR. 2, 1909.

1,042,035.

Patented Oct. 22, 1912.

2 SHEETS—SHEET 2.

Witnesses
F. C. Valentine
G. A. Romano

Inventor:
Albert D. Ray
by Ored B. Billman
his attorney.

UNITED STATES PATENT OFFICE.

ALBERT D. RAY, OF CLEVELAND, OHIO.

RESILIENT VEHICLE-WHEEL.

1,042,035.  Specification of Letters Patent.  Patented Oct. 22, 1912.

Application filed April 2, 1909. Serial No. 487,384.

*To all whom it may concern:*

Be it known that I, ALBERT D. RAY, a citizen of the United States, residing at Cleveland, in the county of Cuyahoga and State of Ohio, have invented certain new and useful Improvements in Resilient Vehicle-Wheels, of which the following is a specification.

My invention relates to improvements in resilient vehicle-wheels, the invention being designed as a substitute for and an improvement on wheels depending, for their resiliency, on pneumatic or other resilient tires, the primary object of the invention being to provide a generally improved resilient wheel embodying the advantages of and eliminating the objections to pneumatic tires.

The invention in its primary embodiment comprises a pair of lateral wheel members providing laterally movable radially split resilient felly-rims carrying a tire having a wedge-shaped contact therewith. The resiliency of the wheel is primarily due to the wedge-shaped contact of the tire between the laterally movable felly-rim, and as a further means of resisting the expanding action of the felly-rims the wheel is preferably provided with concentrically-mounted superposed spring members provided with adjusting means for regulating the pressure or tension of the spring members upon the sides of the lateral members carrying the felly-rims. The sensitiveness of the tire with respect to superposed loads and the impact due to passing obstructions may be readily regulated by the tension regulating means, and the superposed spring members may comprise spring disks concentrically-mounted on the wheel-hub and simultaneously adjusted with respect to their tension by means of tension adjusting hub-nuts.

With the above mentioned objects in view, the invention consists in the novel construction, arrangement, and combination of parts, hereinafter described, illustrated in some of its embodiments in the accompanying drawings, and particularly pointed out in the appended claims.

Figure 6:
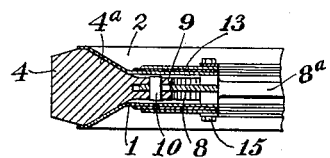
Figure 7:
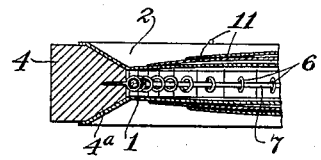
Figure 8:
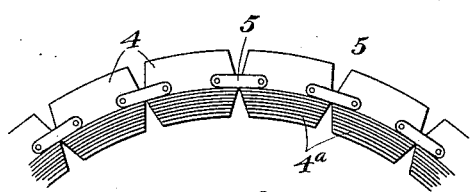
Figure 4:
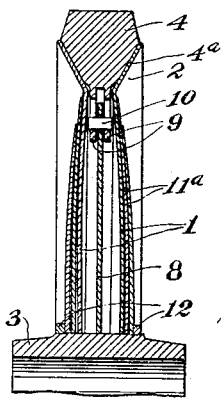
Figure 9:
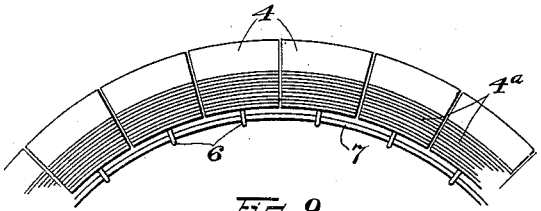
Figure 5:
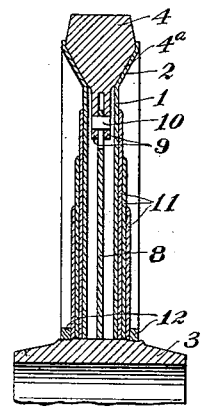
Figure 10:
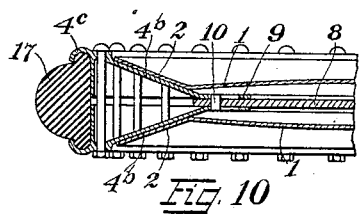

Referring to the drawings, forming a part of this specification, Figure 1, is a side elevation of a portion of a wheel constructed in accordance with this invention, a portion of its side walls or members being broken away for the purpose of clearer illustration of the parts. Fig. 2, a similar view of a modified form of same. Fig. 3, a similar view of another modification of same. Fig. 4, a transverse sectional view of the form of wheel shown in Fig. 1, taken through line 4—4, thereof. Fig. 5, a similar view of the form of wheel shown in Fig. 3, taken through line 5—5, thereof. Fig. 6, a transverse sectional view taken through line 6—6, of Fig. 2. Fig. 7, a transverse sectional view illustrating a modified form of mounting the tire in the laterally movable felly-rims. Fig. 8, a side elevation of another form of assembling and mounting the tire tread-members. Fig. 9, a similar view of the modification of same shown in Fig. 7. Fig. 10, a cross sectional view of a further modification provided with an integral cushion tire.

Similar numerals of reference designate like parts throughout all the figures of the drawings.

The improved vehicle wheel comprises a pair of wheel members 1, terminating at their outer periphery in laterally flexible or movable felly-rims 2, and a hub 3. A tire is mounted between the felly-rims 2, and is adapted to coöperate therewith by a wedge-shaped contact, said tire preferably comprising a plurality or series of radially movable tire tread-members 4. The tire tread-members may be independently mounted with respect to each other as shown in Figs. 1, 2, and 4, or they may be flexibly connected to each other as shown in Figs. 3, 5, 7, 8, and 9. The tire tread-members 4, are adapted to coöperate with the felly-rims 2, by means of a wedge shaped contact, said wedge shaped contact, in the present instance, comprising wedge shaped rim-bearing portions 4ª, adapted to frictionally-engage the adjacent inner sides of the felly-rims. The tire tread members 4, may be flexibly connected to each other by means of pivotally-mounted link members 5, as indicated in Fig. 8, or they may be connected by means of eyelets 6, strung upon an endless cord or member 7, as indicated in Fig. 9, and when thus connected, may be mounted as indicated in Fig. 7, of the drawings.

The tire tread-members 4, are preferably carried upon a median carrying member 8, which may be in the form of a stationary disk member mounted upon the hub 3, as indicated in Figs. 1, 3, 4, 5, and 10, of the drawings, or it may comprise a stationary rim portion carried upon spokes 8ª, as indicated in Figs. 2, and 6, of the drawings. The tire tread members 4, are carried by and radially movable on said median carrying member 8, by means of guide-lugs 9, and guide-pins 10.

The superposed spring members are concentrically mounted upon the hub 3, and may take the form of integral spring disks 11, as indicated in Figs. 3, and 5, of the drawings, or they may take the form shown in Figs. 1, and 4, of the drawings in which latter instance they are provided with radially-extending overlapping leaf springs 11ª. When the superposed spring members are concentrically mounted upon the hub 3, as just described, they are adapted to be simultaneosuly adjusted and regulated with respect to their tension upon the intermediate wheel members by means of tension adjusting hub nuts 12, said adjusting nuts impinging upon the outer central portions of the spring members, and, in the present instance, being threaded upon the exteriorly threaded projecting portions of the hub 3. If desired the superposed spring members may take the form of spring rings 13, provided with radially-extending overlapping leaf springs 13ª, said spring rings 13, being adjustably secured to the median carrying member 8, by means of bolts 14, and adjusting nuts 15. When thus mounted the tension of the leaf springs 13, against the adjacent portions of the wheel members 1, may be adjusted or regulated by means of the adjusting nuts 15.

As a means for giving greater individual movement or elasticity to the several tire tread members 4, with respect to the adjacent felly rims 2, said felly rims may be radially split as at 16, as indicated in Figs. 1, and 2, of the drawings.

In the modification shown in Fig. 10, the wedge shaped rim bearing portions 4ᵇ, are formed by two circumferentially-extending integral members provided at their outer ends with tire engaging hooked flanges 4ᶜ, adapted to receive and contain an elastic tire 17.

From the foregoing description, taken in connection with the accompanying drawings, the operation and advantages of my invention will be readily understood.

Having thus described my invention, what I claim and desire to secure by Letters Patent is,—

1. A resilient vehicle-wheel, comprising a wheel body having radially-split felly-rims, a tire having a wedge-shaped contact with said felly-rims, and independent means for movably carrying said tire.

2. In a resilient vehicle-wheel, the combination with adjustable laterally-movable spring felly-rims; of a tire comprising a series of radially-movable tread-members having a wedge-shaped contact between said felly-rims.

3. In a resilient vehicle-wheel, a wheel body provided with spring resisted felly-rims, a series of wedge-shaped tire tread-members having a wedge engaging contact with said felly-rims, and means for movably securing said tire tread members in operative relationship with said felly-rims.

4. A resilient vehicle-wheel, comprising a hub carrying wheel disks provided with felly-rims, a tire having wedge-shaped rim-bearing portions interposed between said felly-rims, and superposed spring-disks adjustably mounted on said hub.

5. A resilient vehicle-wheel, comprising a median disk member provided with a hub, lateral disk members mounted on said hub and provided with laterally movable felly-rims, a tire carried by and movable on said median disk member and provided with a wedge-shaped portion interposed between said felly-rims, and adjusting nuts on the hub impinging against said lateral disk members.

6. A resilient vehicle-wheel, comprising a tire carrying median member, lateral members provided with radially split felly-rims, a series of tire tread members carried by and radially movable on said median member and provided with wedge-shaped bearing portions interposed between said split felly-rims, a plurality of reinforcing members provided with radially-extending overlapping leaf springs impinging against said split felly-rims, and means for adjusting the tension of said reinforcing members.

7. A resilient vehicle-wheel, comprising a stationary tire-carrying member provided with a hub, laterally movable spring-disks mounted on said hub and providing circumferentially-divided felly-rims, a series of tire tread-members radially movable on said stationary tire carrying member and provided with wedge-shaped rim-bearing portions interposed between said felly-rims, and hub-nuts for adjusting the tension of said spring-disks.

8. A resilient vehicle-wheel, comprising a median disk member provided with a hub, lateral disk-members mounted on said hub and provided with laterally-movable felly-rims, superposed spring-disks concentrically-mounted on said hub, a plurality of tire tread members provided on their inner sides with guide-lugs slidably mounted about the periphery of said median disk member and having a wedge shaped contact between said felly-rims, and tension adjusting hub-nuts impinging against said spring disks.

In testimony whereof I have affixed my signature, in presence of two witnesses.

ALBERT D. RAY.

Witnesses:
O. C. BILLMAN,
FRAU BILLMAN.

Copies of this patent may be obtained for five cents each, by addressing the "Commissioner of Patents, Washington, D. C."